(12) United States Patent
Pedersen

(10) Patent No.: US 9,276,442 B2
(45) Date of Patent: Mar. 1, 2016

(54) STATOR ELEMENT WITH COOLING ELEMENT ARRANGED ON THE BACKSIDE OF THE YOKE

(71) Applicant: Carsten Kiholm Pedersen, Billund (DK)

(72) Inventor: Carsten Kiholm Pedersen, Billund (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 328 days.

(21) Appl. No.: 13/890,528

(22) Filed: May 9, 2013

(65) Prior Publication Data

US 2013/0241328 A1    Sep. 19, 2013

Related U.S. Application Data

(62) Division of application No. 13/152,415, filed on Jun. 3, 2011, now abandoned.

(30) Foreign Application Priority Data

Jun. 11, 2010   (EP) ..................... 10165725

(51) Int. Cl.
*H02K 1/20* (2006.01)
*H02K 9/16* (2006.01)
*H02K 9/22* (2006.01)
*H02K 9/19* (2006.01)

(52) U.S. Cl.
CPC .. *H02K 1/20* (2013.01); *H02K 9/22* (2013.01); *H02K 9/19* (2013.01); *Y02E 10/725* (2013.01)

(58) Field of Classification Search
CPC ............ H02K 9/10; H02K 9/16; H02K 9/19; H02K 9/193; H02K 1/20

USPC ...................................................... 310/52–64
See application file for complete search history.

(56) References Cited

U.S. PATENT DOCUMENTS

| 3,681,628 | A | | 8/1972 | Krastchew |
| 5,002,900 | A | * | 3/1991 | Watanabe ........................ 29/596 |
| 5,347,188 | A | * | 9/1994 | Iseman et al. ................... 310/54 |
| 6,300,693 | B1 | | 10/2001 | Poag et al. |
| 6,800,971 | B1 | | 10/2004 | Mangold et al. |
| 6,819,016 | B2 | | 11/2004 | Houle |
| 8,072,100 | B2 | | 12/2011 | Monzel |
| 2004/0130223 | A1 | | 7/2004 | Nimz et al. |
| 2004/0189108 | A1 | | 9/2004 | Dooley |
| 2005/0206270 | A1 | | 9/2005 | Aisenbrey |
| 2006/0066159 | A1 | | 3/2006 | Enomoto |
| 2006/0103244 | A1 | | 5/2006 | Wang |
| 2007/0024132 | A1 | | 2/2007 | Salamah et al. |

(Continued)

FOREIGN PATENT DOCUMENTS

| CN | 1755092 | A | 4/2006 |
| CN | 101562371 | A | 10/2009 |
| CN | 101728900 | A | 6/2010 |
| DE | 19604643 | A1 | 8/1997 |
| EP | 0627805 | A2 | 12/1994 |

(Continued)

*Primary Examiner* — Michael Andrews

(57) ABSTRACT

A stator element is disclosed. The stator element includes a yoke including laminated metal plates and radially protruding teeth from one side of the yoke. A cooling cavity is arranged on a back side of the yoke. The cooling cavity provides a path for a flow of a cooling medium. A plated metal layer of the cooling cavity is disposed on the yoke only in a region where the cooling cavity contacts the back side of the yoke. The cavity is disposed in direct contact to the back side of the yoke.

11 Claims, 1 Drawing Sheet

(56) References Cited

U.S. PATENT DOCUMENTS

| | | |
|---|---|---|
| 2007/0170806 A1 | 7/2007 | Haldemann |
| 2009/0261668 A1* | 10/2009 | Mantere .......................... 310/54 |
| 2010/0102649 A1 | 4/2010 | Cherney et al. |
| 2010/0102656 A1 | 4/2010 | Booth |
| 2011/0109095 A1* | 5/2011 | Stiesdal .......................... 310/54 |
| 2011/0304229 A1 | 12/2011 | Pedersen |

FOREIGN PATENT DOCUMENTS

| | | |
|---|---|---|
| EP | 2320080 A1 | 5/2011 |
| JP | 2001054271 A | 2/2001 |
| JP | 2007060740 A | 3/2007 |
| WO | WO 03073591 A1 | 9/2003 |
| WO | WO 2006045772 A1 | 5/2006 |
| WO | WO 2007040865 A1 | 4/2007 |
| WO | WO 2011068714 A2 | 6/2011 |

\* cited by examiner

STATOR ELEMENT WITH COOLING ELEMENT ARRANGED ON THE BACKSIDE OF THE YOKE

CROSS REFERENCE TO RELATED APPLICATIONS

This application is a divisional of U.S. application Ser. No. 13/152,415 filed Jun. 3, 2001, the entire content of which is hereby incorporated by reference. This application also claims priority of European application No. 10165725 filed Jun. 11, 2010, the entire content of which is hereby incorporated herein by reference.

FIELD OF THE INVENTION

The invention relates to a stator element having a yoke comprising several laminated metal plates and a number of tooth radially protruding from one side of the yoke and a cooling means providing a path for the flow of a cooling medium along the yoke.

BACKGROUND OF THE INVENTION

Electric machines for power generation such as used in wind turbines for instance comprise a stator and a rotor, the latter being rotatable relative to the stator. During the operation of the electric machine, that is a generator for instance, magnetic fields originating from permanent magnets or wound poles attached to the rotor induce electrical currents into the stator cores and coils in order to generate electrical power. Thereby, large amounts of excessive heat occur due to the induction of current within the stator.

Therefore, it is known to provide the stator or a stator element respectively with cooling means providing cooling of the stator by means of air ventilation, the provision of fins projecting radially from the stator giving rise to an enlarged surface of heat exchange or liquid cooling, whereby a liquid cooling medium like water for instance is conveyed through separate cooling pipes engaging with the stator. The latter principle is described in US 2007/0024132 relating to a method and an apparatus for cooling wind turbine generators.

Aside, additional excess heat is produced by eddy currents usually being generated when a conductor is moved within an inhomogeneous magnetic field or alternatively due to time-dependent variations of a magnetic field. Eddy currents generate magnetic fields opposing the original magnetic field and thus, resulting in a so called eddy current loss. In large scale wind turbines, eddy current losses may reach a significant level, the efficiency of the generator is usually decreased.

A method for minimizing said eddy currents in a wind turbine stator is disclosed in JP 2001-54271 A referring to a brushless motor having a yoke being split in blocks, whereby sheets of insulating paper are disposed between the blocks.

Yet, these methods do not provide sufficient cooling of the stator of an electrical machine like a generator for instance, particularly in times of high-performance.

SUMMARY OF THE INVENTION

Therefore, it is an object of the invention to provide a stator element having an improved cooling capability.

This is achieved by a stator element as described above, wherein the yoke is at least partially provided with a plated metal layer in the region contacted by the cooling means.

The inventive stator element, which may favourably be in the shape of a complete ring-shaped stator or a stator segment adapted to built a ring-shaped stator, is provided with a better cooling performance as the heat exchange capability is significantly increased. In other words, an improved heat exchange is established between the yoke and the cooling means, that is the cooling medium conducting excess heat off the yoke resulting in a better cooling performance of the cooling means and the inventive stator element.

The invention is based on the idea to bring the cooling means in the most-possible close contact to the yoke, whereby additional cooling means such as separate cooling pipes and the use of thermally conductive pastes improving the thermal contact between the cooling pipes and the yoke or the like are not necessary. According to the invention it is possible that the cooling medium is substantially in direct contact with the yoke, whereby the plated metal layer builds an intermediate layer between the cooling medium and the yoke.

Thus, in order to assure that the cooling medium is not able to leak into the stator yoke, that is between the laminated metal plates, in particular steel plates, building the yoke, the yoke is at least partially provided with the plated metal layer. Hence, the plated metal layer acts as a sealing layer and lines the cooling means so as to ensure, that no cooling medium, in particular a liquid cooling medium like water for instance, may leak into or get in contact to the laminated metal plates of the yoke. In such a manner, possible erosive or corrosive effects caused by the contact of the cooling medium with the yoke are excluded due to the plated metal layer, which is of course non erosive and non corrosive in regard to the cooling medium.

The thickness of the plated metal layer may vary, yet leakproof properties must always be given.

Preferably, the cooling means comprises at least one cooling channel and/or at least one cooling cavity. Cooling channels and cooling cavities are known as separate parts attached to the yoke. In contrast according to the invention, the yoke comprises one or more cooling channels and/or cooling cavities being directly formed from the yoke material and separated from the yoke, that is the laminated metal plates by means of the plated metal layer at least partially lining the cooling channel and/or cooling cavity, thereby ensuring that no cooling medium is able to directly contact the yoke or enter the micro-spaces between the laminated metal plates of the yoke. The cooling channel and/or cooling cavity provides a sufficient volume containing the cooling medium so as to provide proper cooling of the yoke and the stator element respectively at all times. The number of cooling channels and/or cooling cavities is not restricted.

Thereby, it is possible that the cooling channel and/or the cooling cavity is integrally built inside the yoke. Accordingly, the yoke may completely encompass the cooling channel and/or the cooling cavity as they are an integrally built part of the yoke giving rise to a large area of heat exchange from the yoke to the cooling channel and/or cooling cavity and hence, an improved cooling behaviour of the stator element.

In this case, that is if the cooling channel and/or the cooling cavity is integrally built inside the yoke, it is favourable that the plated metal layer completely surrounds the cooling channel and/or the cooling cavity. In such a manner, a leak-proof lining is built by the plated metal layer forming a barrier between the yoke and the cooling medium circulating in the cooling channel or the cooling cavity respectively.

Additionally or alternatively, it is possible that the cooling channel and/or the cooling cavity is disposed in direct contact to the yoke. Thus, the cooling means are not disposed inside the yoke but in a disposal giving rise to an at least partial direct contact between the cooling channel and/or the cooling cavity and the yoke, still providing a good and sufficient thermal exchange between the yoke and the cooling channel and/or the cooling cavity. This inventive alternative may be advisable in cases of thin wall thicknesses of the stator element, whereby integrally built cooling means would diminish the mechanical properties of the yoke or the stator element respectively.

In this case, i. e. if the cooling channel and/or the cooling cavity is disposed in direct contact to the yoke, it is preferred that the plated metal layer is disposed in the contact region of the cooling channel and/or the cooling cavity with the yoke. Hence, the cooling channel and/or the cooling cavity are only partly plated, whereby a leak-proof lining is still established in the interface area between the yoke and the cooling channel and/or the cooling cavity by means of the plated metal layer.

Generally, it is possible that one or more cooling means are provided inside the yoke and further in direct contact to the yoke, that is partially outside the yoke or merely inside the yoke or merely in direct contact to the yoke. In any case, the cooling means may comprise both cooling channels and cooling cavities or only cooling channels or only cooling cavities respectively.

It is of advantage, when the cooling channel and/or the cooling cavity extends in a meander-like shape. Meander-like shapes allow a most-possible long path of the cooling channel and/or the cooling cavity through the yoke giving rise to further increased heat exchange or cooling properties respectively of the stator element respectively. Both, that is cooling channels and/or cooling cavities may be arranged in a meander-like manner, whereby additionally separate connecting elements in particular regarding the meander-like shaped cooling cavities may be useful in the turns of the meander. Generally, the inventive stator element has the possibility to create specifically shaped or designed cooling paths which would not be feasible or at least difficult to obtain with conventional cooling pipes or the like.

It is possible, that a first cooling channel and/or a first cooling cavity communicates with at least one further cooling channel and/or at least one further cooling cavity and/or at least one cooling unit supplying a cooling medium by a connecting means, in particular a hose. In such a manner, a serial and/or parallel connection of the cooling channels and/or cooling cavities is possible. Thereby, several cooling channels for instance may be connected in serial, whereby a first portion of the cooling channel may have an inlet connected to an external cooling unit supplying a cooling medium like water for example and another cooling channel or turn of the meander-like shaped cooling channel may have an outlet connected to the external cooling unit as well. Of course, it is also possible that each cooling channel is separately connected to a cooling unit. The same applies to the cooling means in the shape of a cooling cavity. Thereby, in favour the connection between the cooling channels and/or the cooling cavities among each other as well as the connection between the cooling channels and/or the cooling cavities to the cooling unit is established by dint of appropriate hoses.

The plated metal layer is advantageously provided by physical and/or chemical deposition, in particular physical or chemical vapour deposition and/or electroplating, or mechanical plating. All possible deposition methods permit the creation of homogeneous leak-proof films of deposited metal on the surface of the yoke comprising the laminated metal plates. In such a manner, all micro-spaces between the laminated metal plates are leak-proof sealed or lined. Generally, all possible depositing methods for depositing metal films like vacuum based sputtering or other physical or chemical vapour deposition methods are applicable as well.

Thereby, electroplating or electro deposition is especially preferred as it provides a reliable manner to deposit homogeneous films or layers on a substrate. Generally, an ionic metal is supplied with electrons to form a non-ionic bulk layer of deposited metal on the yoke, that is particularly the cooling channel and/or the cooling cavity. This is achieved by an electro-chemical system involving an electrolyte containing the ionic metal. A galvanic cell is built by means of an anode, which may be the yoke or the laminated metal plates respectively and a cathode wherein by means of electro-chemical processes electrons are supplied to produce a deposited metal film on the surface of the yoke and/or of only partially plated areas of the yoke as required in the contact region of the cooling channel and/or the cooling cavity with the yoke. By means of electro deposition all areas may be provided with a homogeneous metal layer, as the yoke is immersed into the electrolyte, so that the electrolyte may contact all relevant yoke parts to be coated.

There is generally no limitation concerning the deposited or plated metal, every feasible metal may be used. However, it is preferred, that the plated metal layer has the same or a like coefficient of thermal expansion as the material of the laminated metal plates of the yoke. In such a manner, there is no or only a reduced danger of different thermally induced expanding of the material, that is different volume changes between the yoke and the plated metal layer due to heating of the yoke giving rise to the formation of thermally induced stresses which possibly may lead to an undesired removal or damage of the plated metal layer. The same applies to all heat-dependent material parameters such as thermal resistance or the like, whereby generally a relatively low thermal resistance is of advantage since this assures a proper heat exchange capability.

It may be that the metal layer is made of the same material as the laminated metal plates of the yoke. In such a manner, the mechanical and thermal behaviour between the yoke and the plated metal layer is almost the same, as only thickness-dependent quantities provide differences in the material behaviour. Thus, the material of the yoke, that is the material of the laminated metal plates essentially shows the same mechanical behaviour when heated or cooled.

In a further embodiment of the invention the cooling means is disposed at the side of the stator element opposite to the tooth. Hence, the inventive cooling means may be built in areas of the stator yoke, where the induced magnetic fields are comparatively low, i. e. only little eddy currents are induced. In such a manner, the occurrence of galvanic connections within the yoke by means of the plated metal layer, which is of course electrically conductive is reduced.

The stator element may be a complete ring-shaped stator as being used in known electric machines comprising a rotor rotating relative to a stationary stator. Likewise, the stator element may be a stator segment having the shape of a segment of a circle adapted to build a ring-shaped stator when assembled with respective stator segments. Segmented stators comprising a number of stator segments are advantageous in terms of transport, assembly and/or maintenance for instance as the parts to be handled are significantly smaller in comparison to a complete stator ring.

Aside, the invention relates to an electric machine having a rotor and a stator or a segmented stator comprising a number of stator segments adapted to built a ring-shaped stator when assembled as described before.

BRIEF DESCRIPTION OF THE DRAWINGS

In the following the invention is described in detail as reference is made to the figures, whereby.

DETAILED DESCRIPTION OF THE INVENTION

Figure 1:
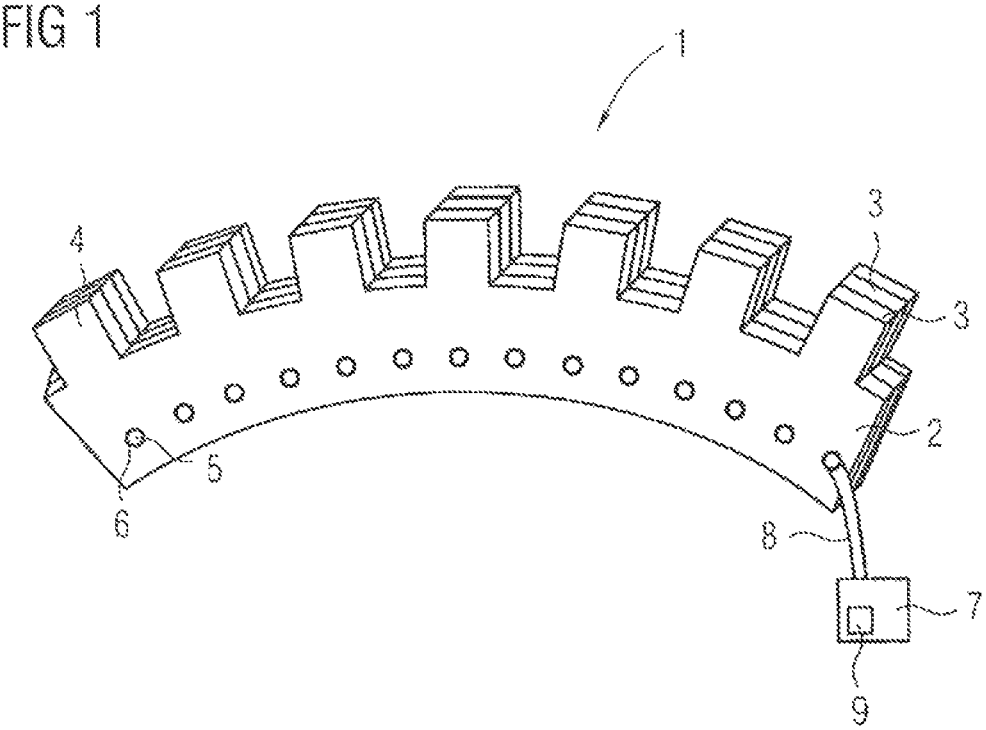
FIG. 1 shows a principle cut view of an inventive stator element according to a first embodiment of the invention.

FIG. 1 shows a principle cut view of an inventive stator element 1 according to a first embodiment of the invention. The stator element 1 is in the shape of a segment of a circle and thus, represents a stator segment adapted to built a ring-shaped stator when connected to further respective stator elements 1. Likewise, the stator element 1 could be a complete ring-shaped stator (cf. FIG. 2). The stator element 1 is part of an electric machine for generating power such as a generator used in a large scale wind turbine for instance. The stator element 1 has a yoke 2 built of several laminated steel plates 3. Stator tooth 4 radially protrude from the yoke 2 for accommodating stator windings (not shown) in known manner.

The stator element 1 comprises a cooling means in the shape of several cooling channels 5 integrally built inside the yoke 2, whereby a plated metal layer 6 completely surrounds each of the cooling channels 5 so as to provide a lining of the cooling channels 5 assuring that no cooling medium, particularly water, may contact the yoke 2, that is may enter into the micro-spaces between the laminated steel plates 3 and cause erosive, corrosive or other damaging effects to the laminated steel plates 3. The plated metal layer 6 essentially has the same or like thermal properties as the laminated steel plates 3 building the yoke 2, in particular regarding the coefficient of thermal expansion. Moreover, the plated metal layer 6 shows good thermal conductive behaviour, that is has a low thermal resistance for instance. The plated metal layer 6 may be made of copper or a copper-based alloy for instance.

The plated metal layer 6 is created by an electro chemical process, that is electro plating giving rise to the deposition of homogeneous, dense metal films on an electrically conductive surface represented by the laminated steel plates 3 of the yoke 2 according to the invention.

The cooling channels 5 build a cooling path within the yoke 2 as the cooling channels 5 extend in a meander-like shape along the yoke 2. Generally, the inventive stator element 1 comprises the possibility to generate alternatively or specially designed cooling paths within the yoke 2 which would not be feasible or at least very cumbersome and difficult to establish with separate cooling means such as cooling pipes or the like.

As is discernible, the inventive stator element 1 provides essentially a direct contact of the cooling medium flowing in the cooling means, that is the cooling channels 5 with the yoke 2 which is heated during the operation of the electric machine due to inductive effects for instance. Having the cooling channels 5 integrally built inside the yoke 2, the inventive stator element 1 does not need any additional separate cooling means as cooling pipes or the like. Accordingly, the use of thermally conductive cooling pastes is not necessary.

The cooling channels 5 are disposed on the side of the yoke 2 opposite to the stator tooth 4. In this manner, a galvanic connection of the laminated steel plates 3, which in turn may generate eddy currents within the yoke 2 does not significantly cause heating of the yoke 2 as in this areas of the yoke 2 magnetic fields are generally low due to the distance to the stator tooth 4, accommodating the stator windings. Only comparatively weak eddy currents may be induced by the galvanic connection of the laminated steel plates 3 due to the plated metal layer 6.

Further, the stator element 1, that is the cooling channel 5 is connected to an external cooling unit 7 supplying the cooling medium, in particular water by means of a hose 8. The cooling unit 7 comprises a control unit 9 controlling all cooling relevant parameters of the cooling medium such as temperature, pressure, and flow for instance.

Figure 2:
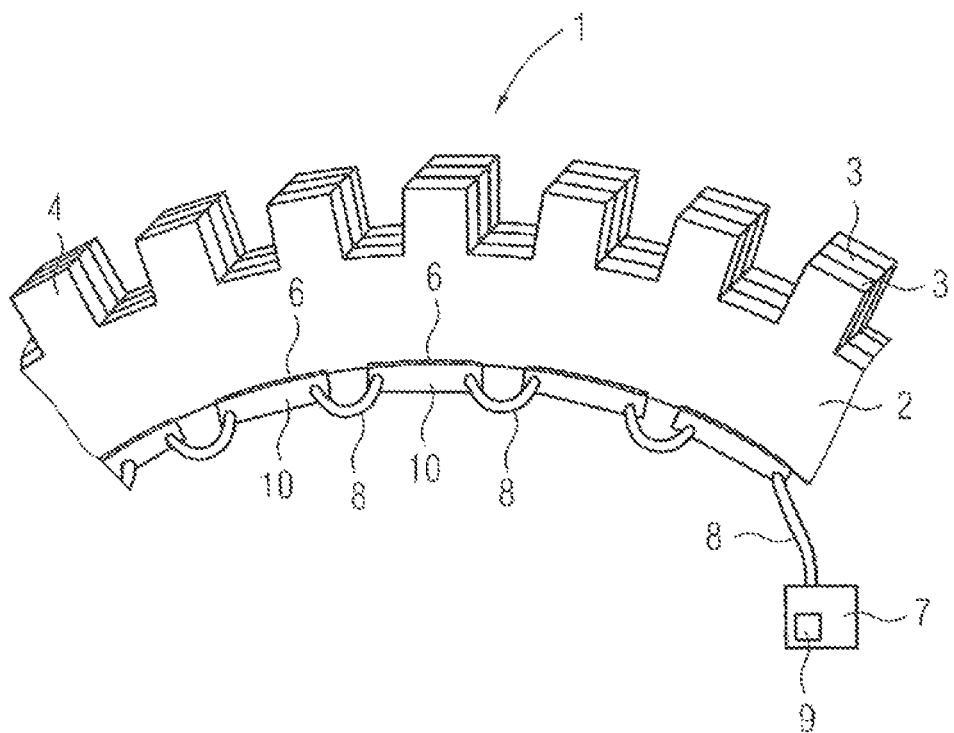
FIG. 2 shows a principle cut view of an inventive stator element according to a second embodiment of the invention.

FIG. 2 shows a principle cut view of an inventive stator element 1 according to a second embodiment of the invention. The essential difference to the embodiment according to FIG. 1 concerns the cooling means, which are not built as cooling channels as depicted in FIG. 1 but as cooling cavities 10 disposed in direct contact to the back side of the yoke 2. Thus, the plated metal layer 6 is only disposed in the contact region of the cooling cavities 10 with the yoke 2. In other words, this embodiment comprises partly plating of the cooling cavities 10 or the yoke 2 respectively so as to ensure a leak-proof lining of the cooling cavities 10 in their contact areas with the yoke 2. That is, a plated metal layer 6 is disposed in the region of the upper areas of the cooling cavities 10 with respect to FIG. 2. Still, maximal thermal exchange between the yoke 2 and the cooling cavities 10 is provided giving rise to a maximal removal of excess heat from the yoke 2. This embodiment represents an alternative to the attachment of separate closed cooling apparatuses mounted on the back side of the yoke 2 thermally conducted by means of a thermally conductive paste for instance known from prior art.

The cooling cavities 10 comprise inlets and outlets, whereby hoses 8 establish a serial connection of the cooling cavities 10. Generally, the cooling means, that is the cooling cavities 10 respectively can be connected in serial, parallel or any combination thereof. Again, at least one cooling cavity 10 is connected to an external cooling unit 7.

Even though it is not shown, a combination of the principles depicted in the embodiments according to FIG. 1 and FIG. 2 is thinkable as well, that is cooling channels 5 and/or cooling cavities 10 may be built inside the yoke 2 and further additional cooling channels 5 and/or cooling cavities 10 may be disposed in the contact region with the yoke 2.

The present stator element 1 is applicable for the use in all rotor-stator configurations, that is both for outer rotor—inner stator configurations and inner rotor—outer stator configurations.

The invention claimed is:

1. A stator element comprising:
   a yoke comprising a plurality of laminated metal plates and a plurality of tooth radially protruding from one side of the yoke;
   a cooling cavity arranged on a back side of the yoke, the back side of the yoke disposed on a side of the yoke opposite of the plurality of tooth, the cooling cavity providing a path for a flow of a cooling medium; and
   a plated metal layer disposed on and forming only the upper area of the cooling cavity disposed on the yoke only in a region where the cooling cavity contacts the back side of the yoke,
   wherein the cavity is disposed in direct contact to the back side of the yoke.

2. The stator element as claimed in claim 1,
   wherein the cooling cavity extends in a meander-like shape.

3. The stator element as claimed in claim 1, further comprising:
   a further cooling cavity arranged on the backside of the yoke, the further cooling cavity, the further cooling cavity providing a further path for the flow of the cooling medium; and a further plated metal layer of the further cooling cavity disposed on the yoke only in a region where the further cooling cavity contacts the back side of the yoke; and a hose connecting the cooling cavity with the further cooling cavity.

4. The stator element as claimed in claim 1, further comprising:

a hose connecting the cooling cavity to a cooling unit which supplies the cooling medium.

5. The stator element as claimed in claim 1, wherein the plated metal layer is formed by physical and/or chemical deposition.

6. The stator element as claimed in claim 5, wherein the plated metal layer is formed by a physical vapour deposition or a chemical vapour deposition and/or an electroplating, or a mechanical plating.

7. The stator element as claimed in claim 1, wherein the plated metal layer has a same coefficient of thermal expansion as the laminated metal plates of the yoke.

8. The stator element as claimed in claim 1, wherein the plated metal layer is made of a same material as the laminated metal plates of the yoke.

9. The stator element as claimed in claim 1, wherein the stator element is a ring-shaped stator.

10. The stator element as claimed in claim 1, wherein the stator element is a stator segment to build a ring-shaped stator when assembled.

11. An electric machine comprising:

a stator element as claimed in claim 1.

\* \* \* \* \*